March 19, 1946.   W. F. GROENE ET AL   2,396,784
MULTIPLE SPINDLE CENTER DRIVE LATHE FEED MECHANISM
Original Filed June 20, 1942   12 Sheets-Sheet 1
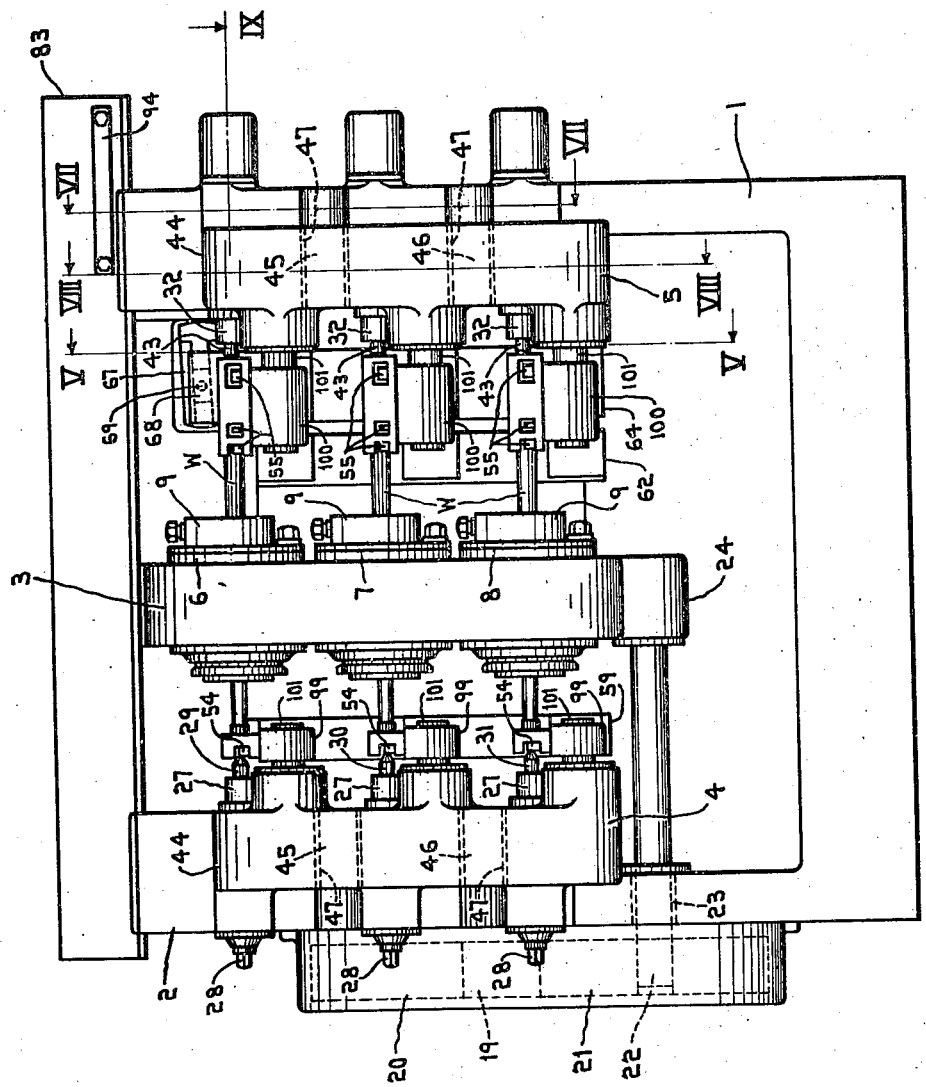
INVENTORS.
WILLIAM F. GROENE
ARTHUR W. AUFDERHAR
BY
ATTORNEYS

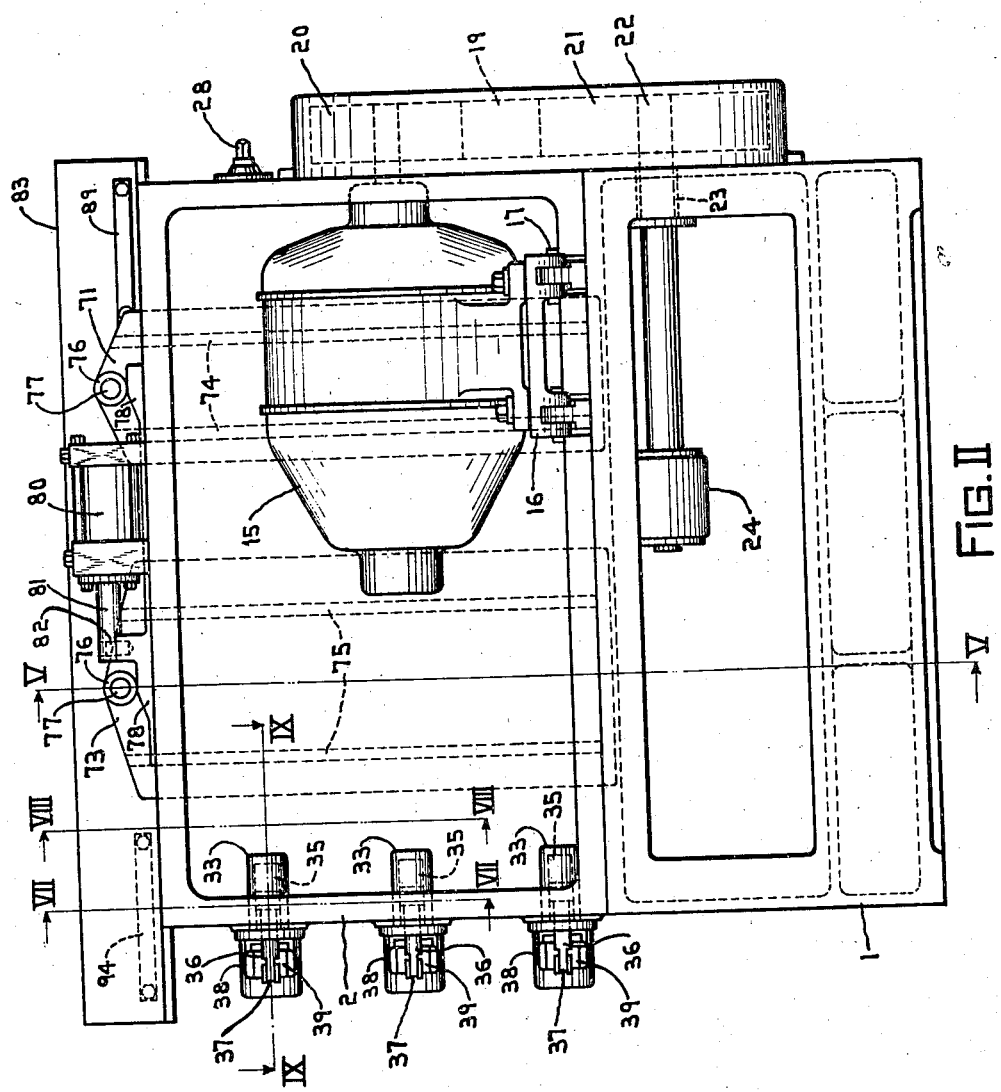

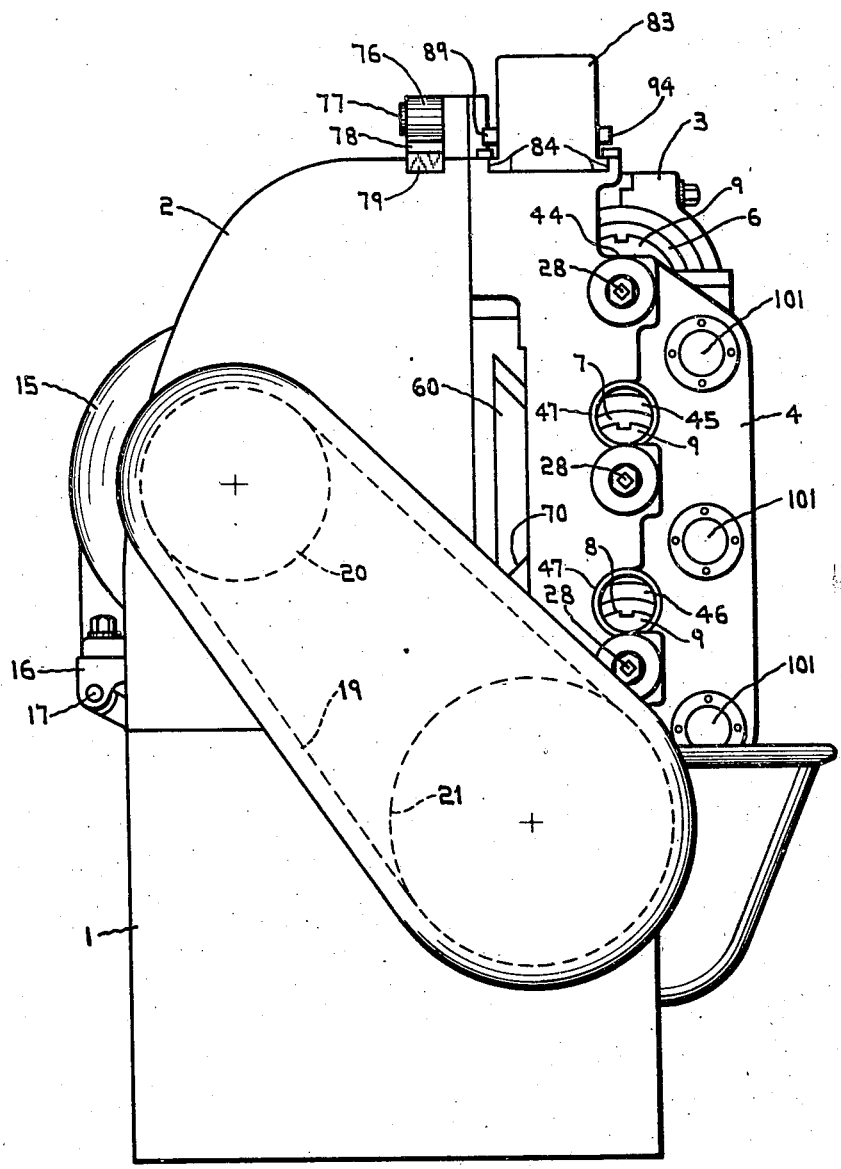
FIG.III

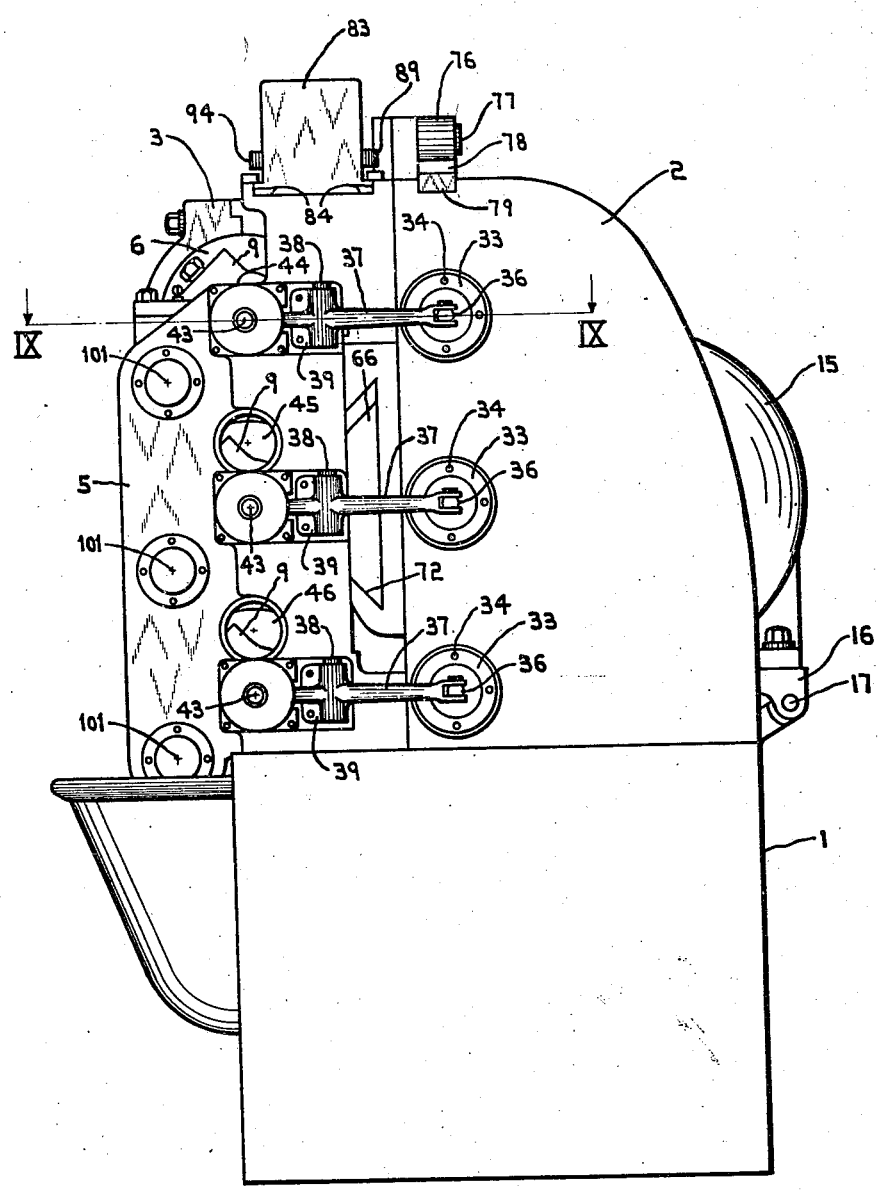

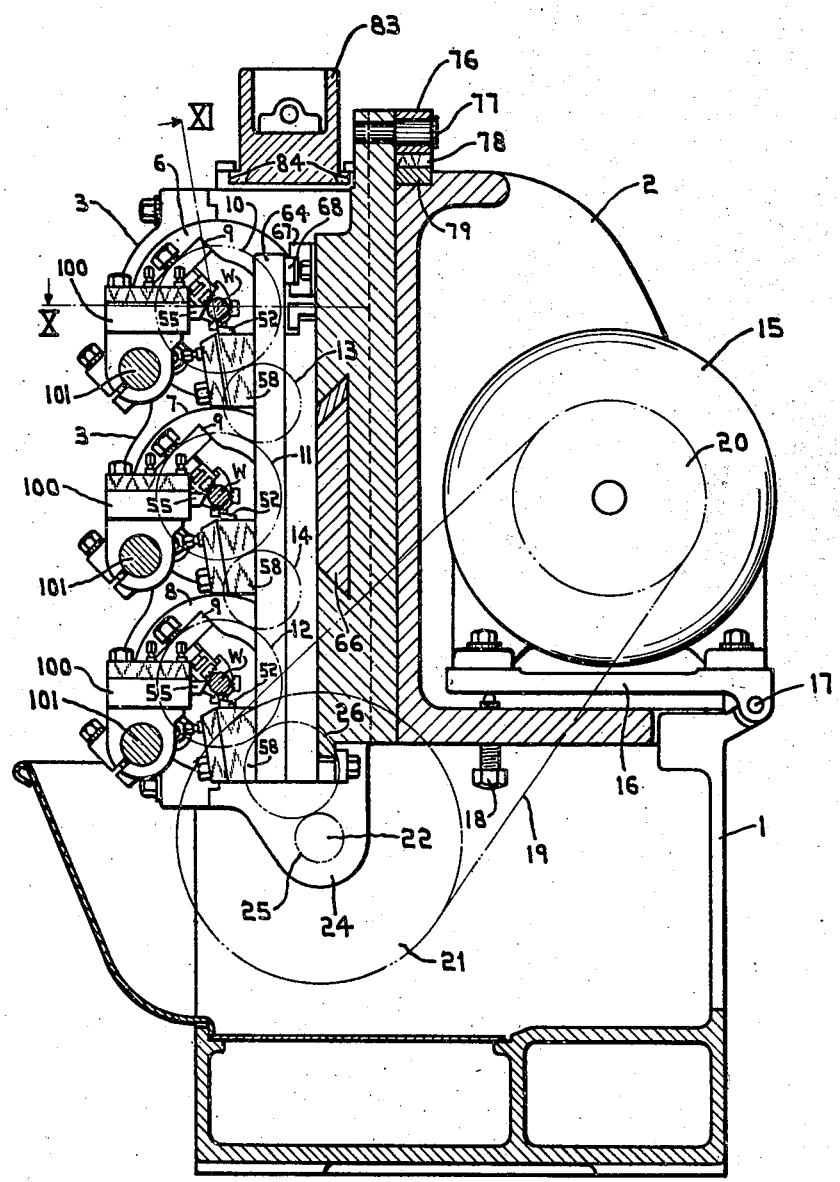
FIG. V

March 19, 1946. W. F. GROENE ET AL 2,396,784
MULTIPLE SPINDLE CENTER DRIVE LATHE FEED MECHANISM
Original Filed June 20, 1942 12 Sheets-Sheet 6
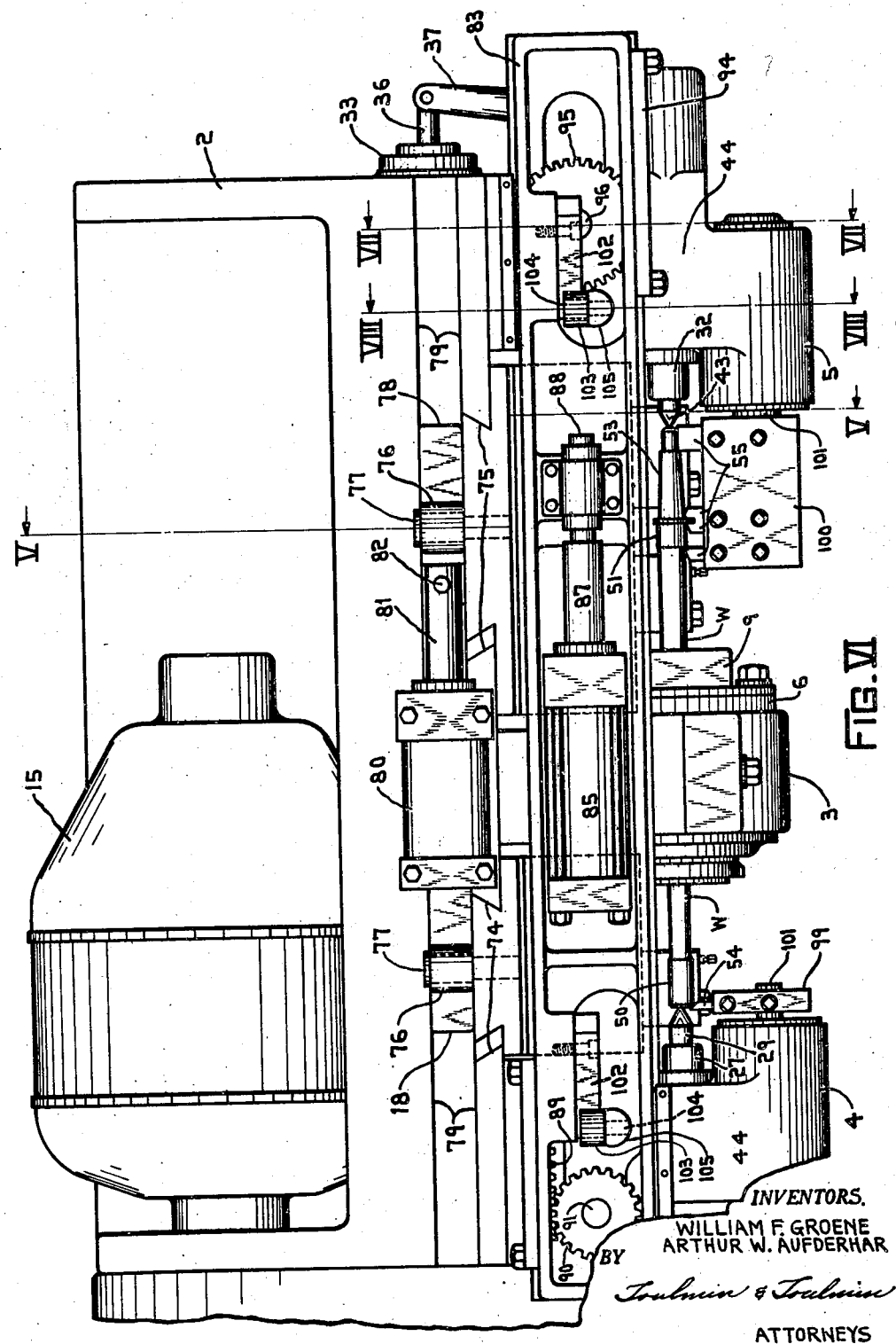
INVENTORS.
WILLIAM F. GROENE
ARTHUR W. AUFDERHAR
BY Toulmin & Toulmin
ATTORNEYS

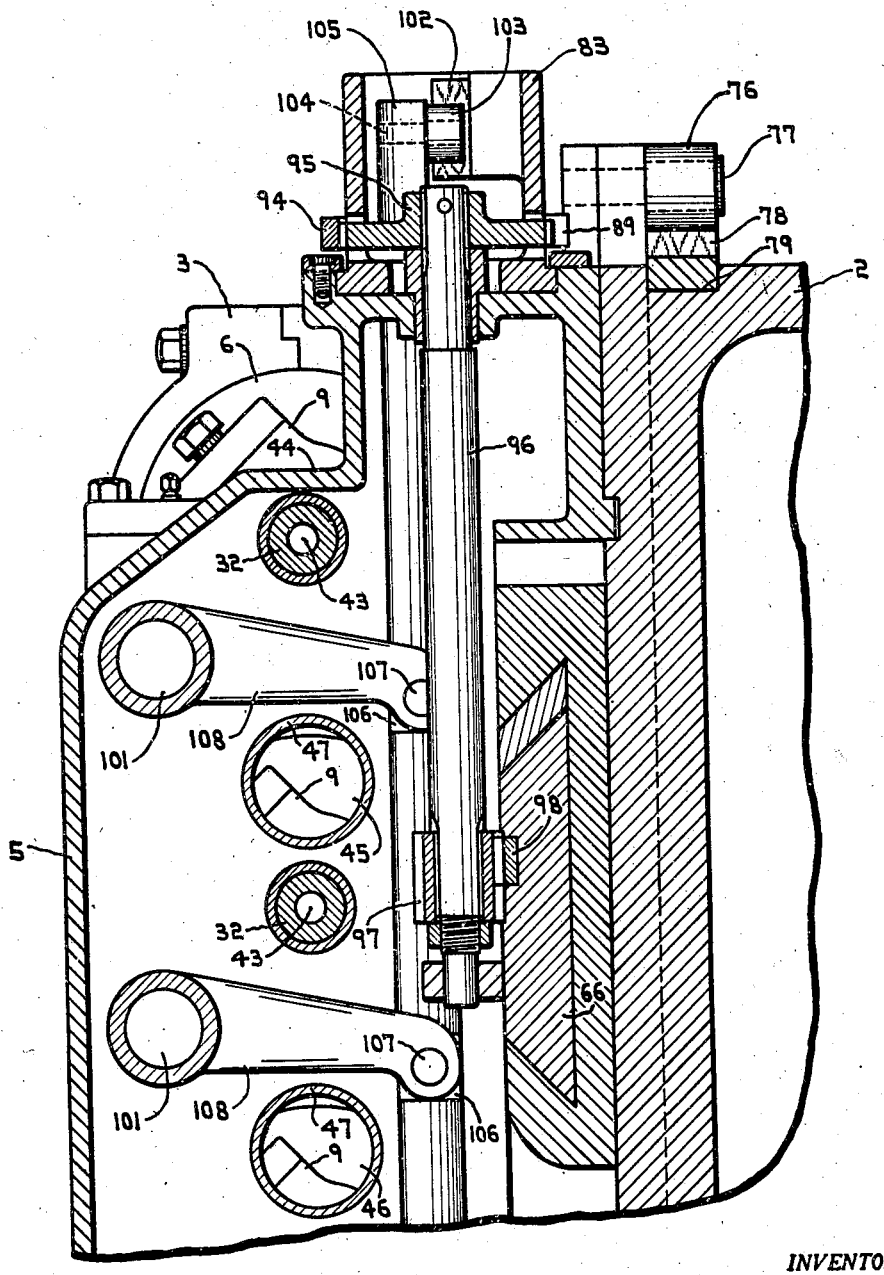
Fig. VII

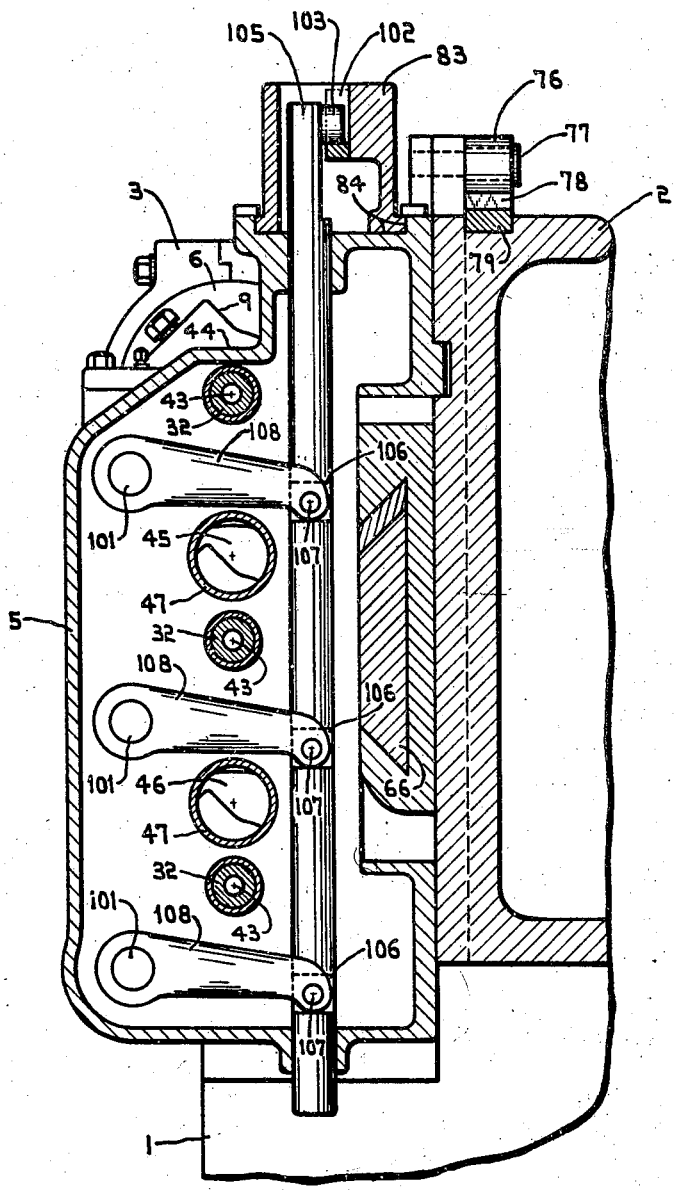
Fig. VIII

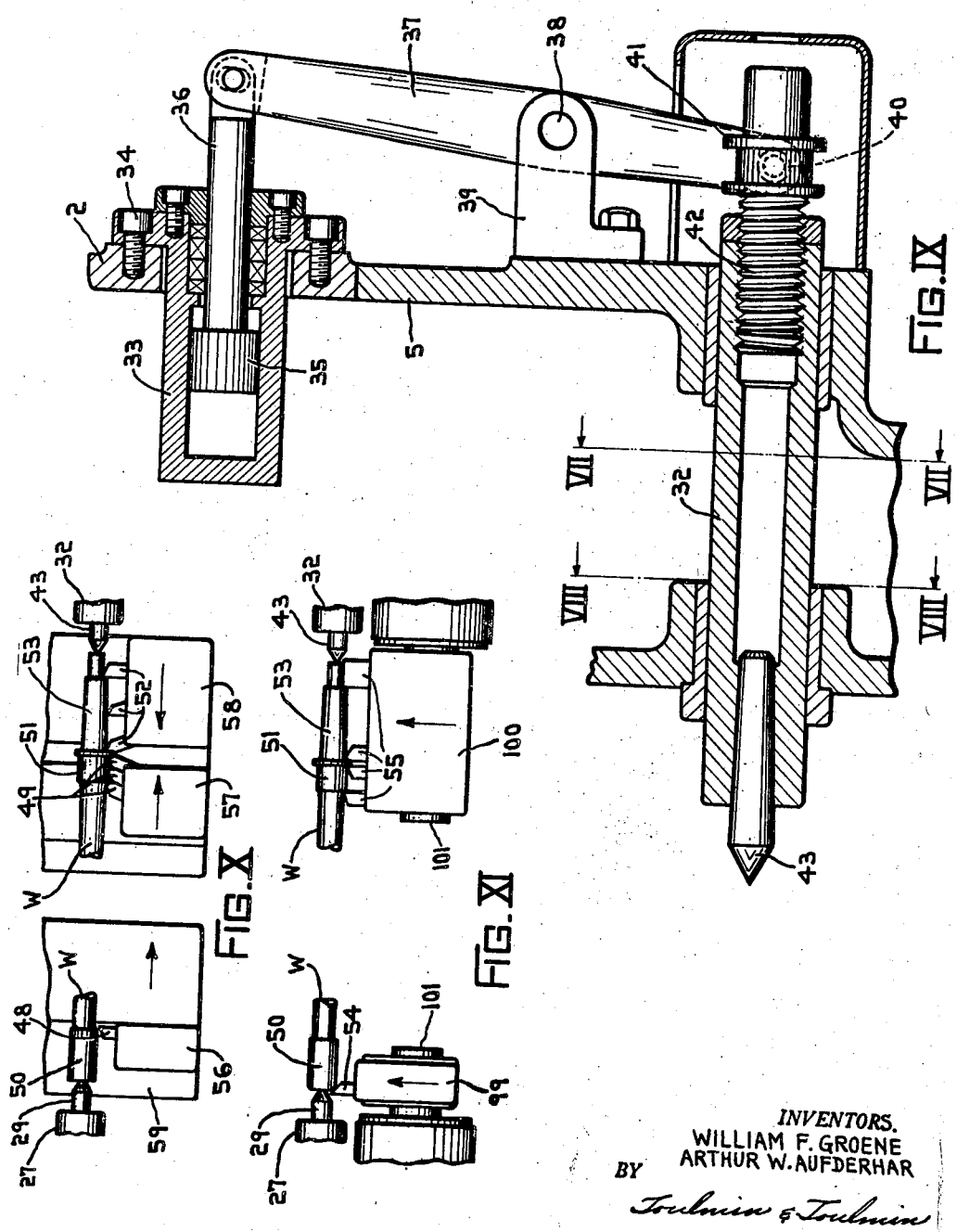

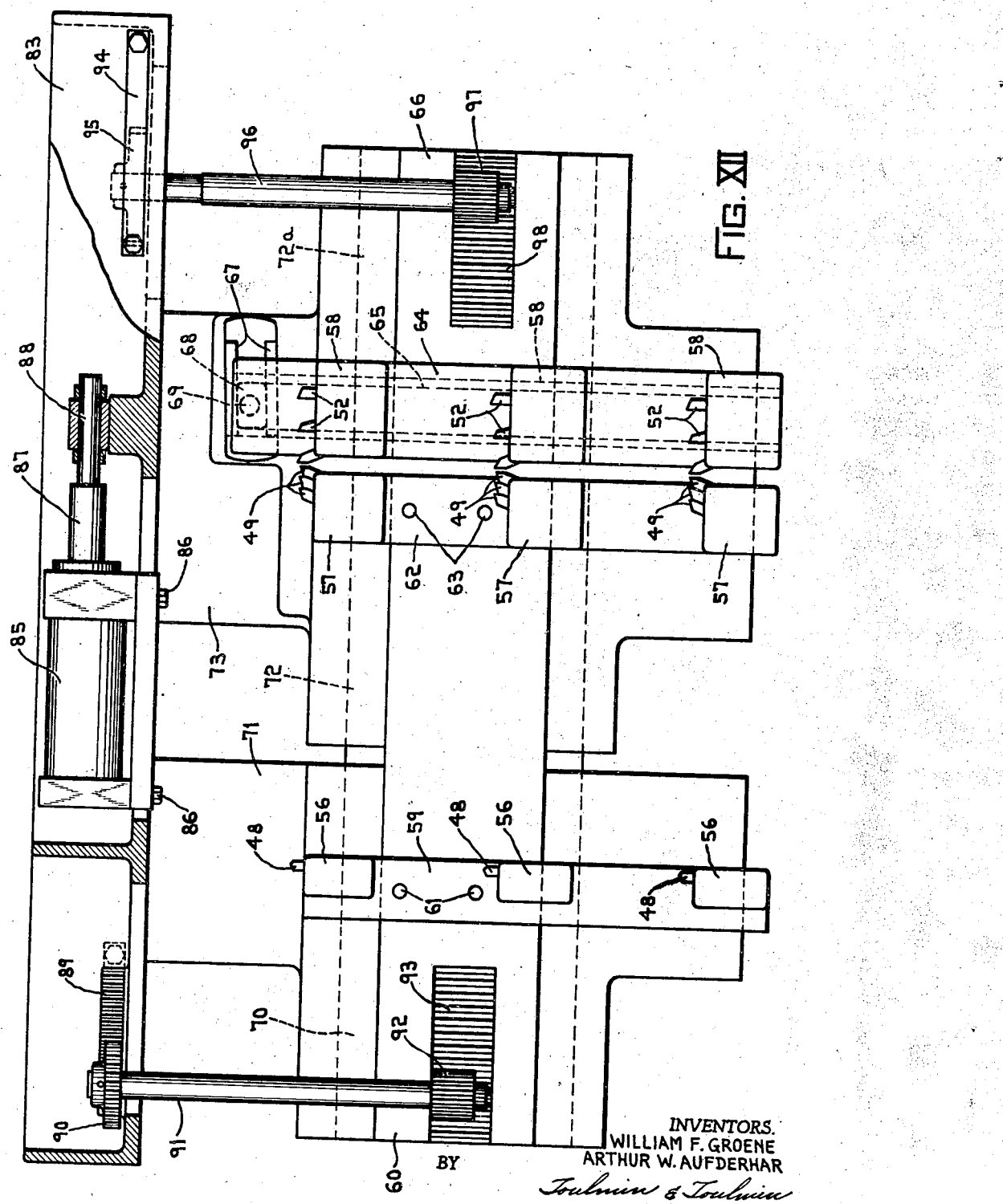

March 19, 1946.  W. F. GROENE ET AL  2,396,784
MULTIPLE SPINDLE CENTER DRIVE LATHE FEED MECHANISM
Original Filed June 20, 1942   12 Sheets-Sheet 11
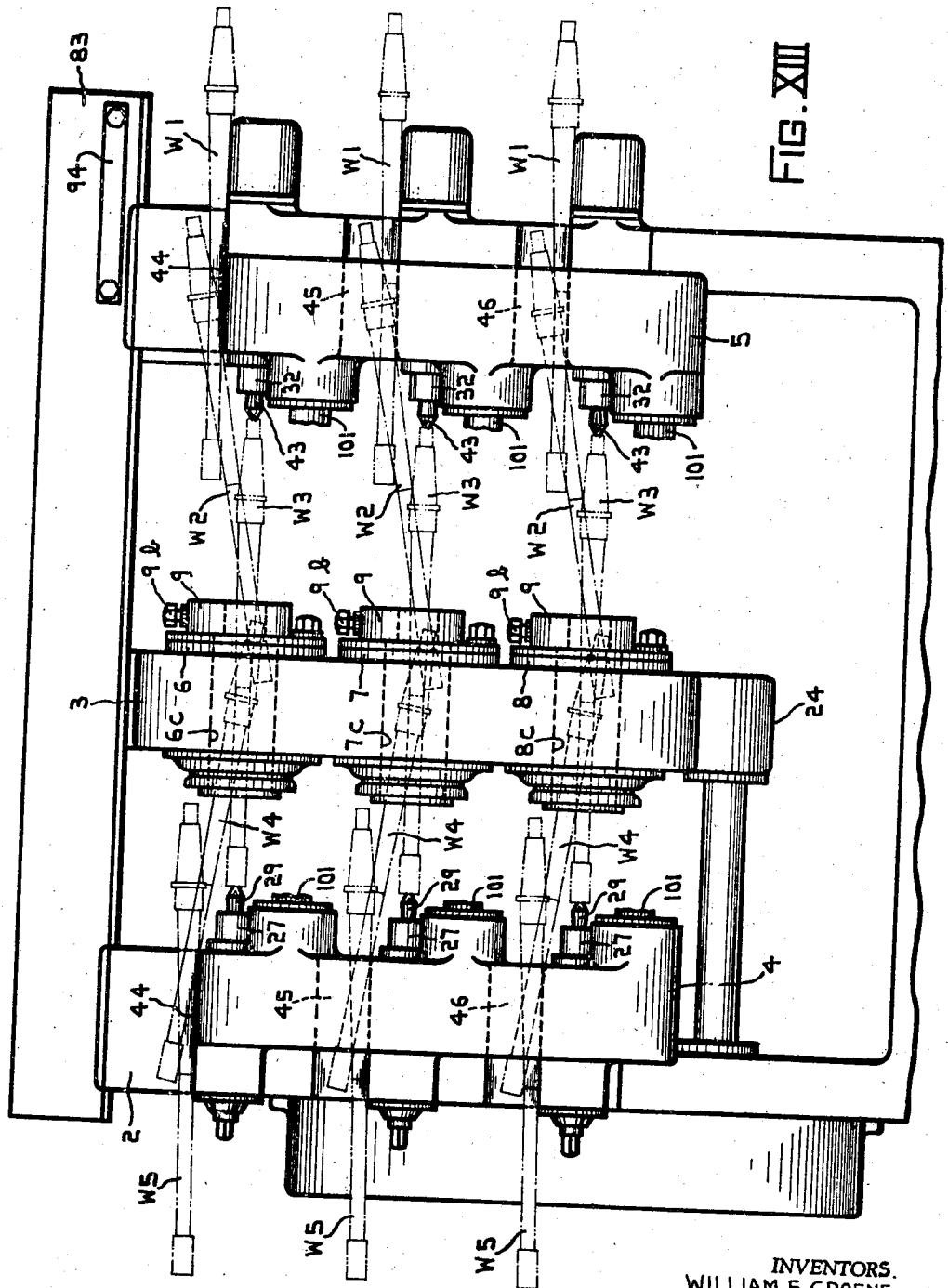
FIG. XII
INVENTORS.
WILLIAM F. GROENE
ARTHUR W. AUFDERHAR
BY
Toulmin & Toulmin
ATTORNEYS March 19, 1946.  W. F. GROENE ET AL  2,396,784
MULTIPLE SPINDLE CENTER DRIVE LATHE FEED MECHANISM
Original Filed June 20, 1942  12 Sheets-Sheet 12
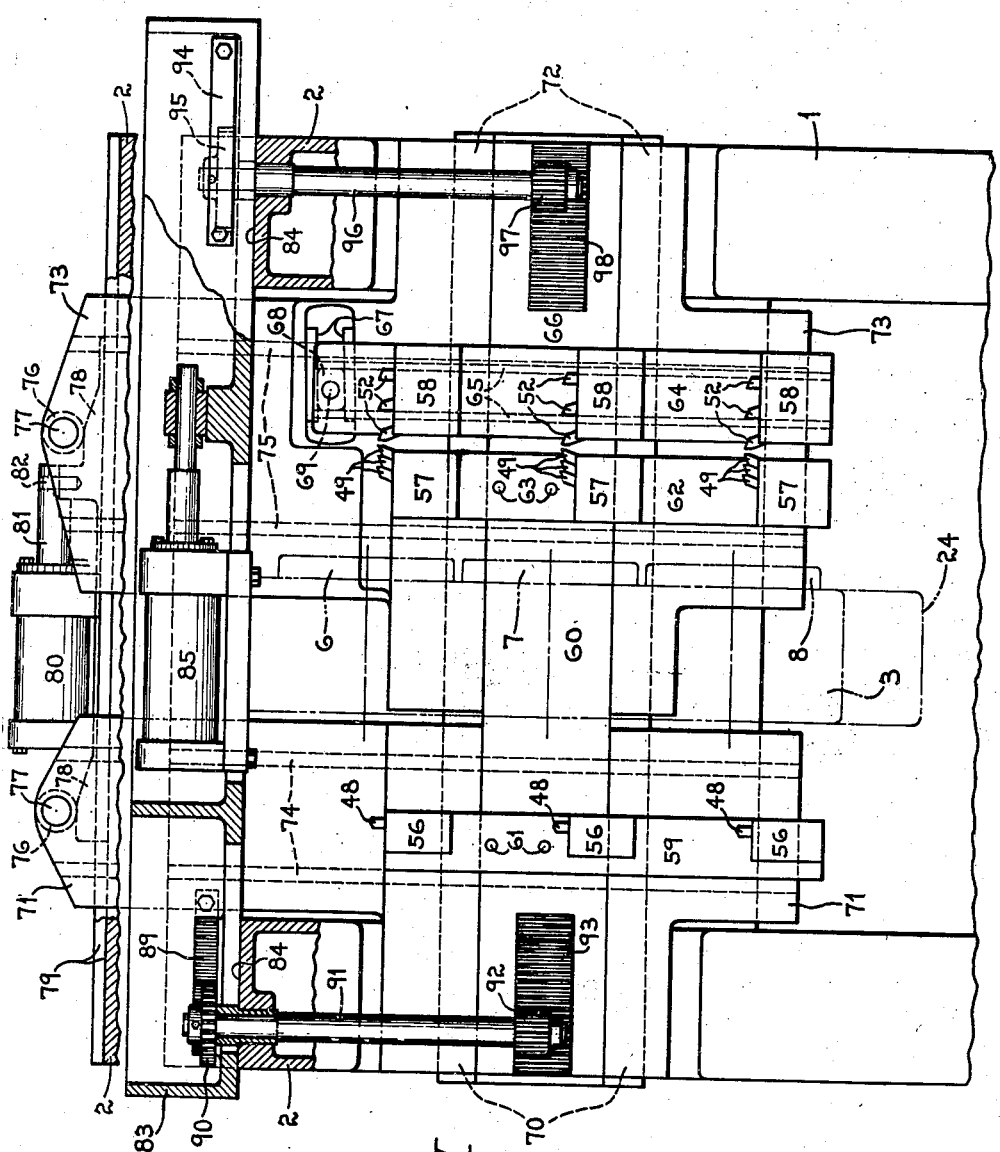
FIG. XIV
INVENTORS.
WILLIAM F. GROENE
ARTHUR W. AUFDERHAR
BY
ATTORNEYS.

Patented Mar. 19, 1946

2,396,784

UNITED STATES PATENT OFFICE 2,396,784

MULTIPLE SPINDLE CENTER DRIVE LATHE FEED MECHANISM

William F. Groene and Arthur W. Aufderhar, Cincinnati, Ohio, assignors to The R. K. Le Blond Machine Tool Co., Cincinnati, Ohio, a corporation of Delaware Original application June 20, 1942, Serial No. 447,810. Divided and this application December 18, 1943, Serial No. 514,732

9 Claims. (Cl. 82—17)

This application is a division of our application Serial No. 447,810, filed June 20, 1942, and assigned to the same assignee as the present application.

This invention pertains primarily to multiple spindle lathes of the center drive type in which a plurality of work pieces are chucked and rotated by means of center drive chucking mechanism and are supported rotatively on their ends by means of the usual tailstock centers of such center drive lathes. In lathes of the center drive type it has always been a problem to load the work pieces past the tailstock into the center drive chuck. This problem becomes much more complicated when a plurality of center drive work spindles are to be utilized. This difficulty is brought about by the presence of a plurality of tailstocks which must be associated with the center drive chucks and which must be relatively closely spaced to effect an overall size for the machine well within its range of efficient operation and manipulation by the operator. As a result it has been difficult to effect the loading of each of the work pieces for each of the center drive work spindles past their respective tailstocks and it is one of the chief objects of this invention to obviate this difficulty by providing a single unitary housing for all of the tailstock centers fixed on the frame of the lathe and to provide passageways through this housing eccentric of the work spindle axis through which the work may be axially loaded into the center drive chucks of the work spindles of the lathe.

It is a further object to provide, in such a lathe of the multiple spindle center drive type, means for effecting both straight and tapered turning operations and facing operations simultaneously at all of the work spindles of the machine with appropriate tool feeding devices having passageways in susbtantial augment with the passageways in the tailstock housings of the lathe to permit proper loading of the work therein. It is also a further object to provide facing tools located on the housing for the tailstocks of the machine which may be moved to and from the work radially to effect necessary forming and facing operations desired on the work pieces.

It is also an object to arrange the machine with facing tool feeding devices mounted on the housings of the tailstocks with passageways through the tailstock housings so that the work may be efficiently and easily loaded into the machine without interference with the cutting tools and tailstocks and without preventing proper access to said tools and the work pieces by the operator.

A further object of this invention is to provide in a multiple spindle center drive lathe an arrangement in which all of the work spindles are mounted in a vertical plane, spaced one above the other and to provide appropriate feeding mechanism in which there is a tool release arrangement provided for the turning tools which functions vertically to move the turning tools into and out of work operating position and to also provide in conjunction with such turning tool feeding mechanism, facing tools which are pivotally mounted on the tailstock housings of the machine which may also be simultaneously fed radially to and from the work pieces of the various work spindles.

It is a further object of this invention to effect the straight turning, taper turning, and facing operations of the various cutting tool feeding devices from cam mechanism located on top of the machine for accessibility and free from the cutting coolant and chips of the machine during its operation, said cam feeding mechanism being located well above all of the vertically arranged work spindles of the machine.

Further features and advantages of this invention will appear from the detailed descriptions of the drawings in which:

Figure I is a front elevational view of the multiple spindle center drive lathe of this invention, particularly showing the location of the center drive work spindle housing, the end tailstock housing, the loading passageways through the tailstock housing for axial insertion of the work pieces in the center drive chucks on the work spindle, and also showing the swinging facing tools mounted on the tailstock housing.

Figure II is a rear elevational view of the machine shown in Figure I, particularly showing the main drive motor for rotating the work spindles, the tool relief cam mechanism for the turning tool slides, and the fluid pressure actuating cylinders for operating the centers in the left hand tailstock.

Figure III, a left hand end elevational view of the machine of Figures I and II, particularly showing the belted motor drive connection for rotating the work spindles, and the loading passageways formed in the housing carrying the left hand tailstock centers.

Figure IV is a right hand end elevational view of the machine of Figures I and II particularly showing the hydraulic lever operated mechanism for moving the centers for the right hand tailstocks of the machine and also the loading passageways through the housings for these tailstocks.

Figure V is a vertical transverse section, shown on the line V—V of Figures I, II, and VI, particularly showing the relationship of the turning tools on the turning tool slide, the taper attachment mechanism of the turning tool slides, and the swinging facing tools mounted on the tailstock housing.

Figure VI is a fragmentary enlarged plan view of the machines of Figures I and II particularly showing the cam feeding mechanism the cam tool relief means for the turning tools, and showing the application of the facing tools to a work piece in the top work spindle of the machine.

Figure VII is an enlarged fragmentary transverse section through the machine on the lines VII—VII of Figures I, II, VI, and IX, particularly showing the rack and the pinion actuating mechanism for effecting the turning feeding movement for the turning tool slide.

Figure VIII is an enlarged fragmentary transverse view through the machine on the line VIII—VIII of Figures I, II, VI, and IX, particularly showing the cam actuating mechanisms for simultaneously moving all of the basic tool feeding devices to and from the work.

Figure IX is an enlarged fragmentary horizontal section through one of the right hand tailstocks which are operated by hydraulic pressure as shown on the line IX—IX of Figures I, II, and IV, showing the hydraulic actuating cylinder for axially reciprocating the tailstock barrel and center when loading and unloading work in the machine tool.

Figure X is a diagrammatic view showing the application of the turning tools to a work piece mounted in the lathe, indicating the specific operations undertaken by said tools.

Figure XI is a similar diagrammatic view to that of Figure X but showing the facing tools operating upon a typical work piece mounted in the lathe, indicated on the line XI—XI of Figure V.

Figure XII is an enlarged diagrammatic view of the feeding mechanism for the turning tool slides.

Figure XIII is a fragmentary diagrammatic front elevation of the machine shown in Figure I, with the tool feeding devices removed, to more clearly show the manipulation of the work into and out of working position on the various work spindles of the machine.

Figure XIV is a diagrammatic layout showing the relationship of the various operative elements of the tool relief and feeding mechanism of the machine.

The machine comprises a base 1 upon which is mounted the frame 2, to which is fixed the center drive work spindle housing 3, the left hand tailstock housing 4 and the right hand tailstock housing 5.

In the center drive housing 3 is journaled three center drive work spindles 6, 7, and 8 each having appropriate chucking means 9 for gripping and holding work pieces, in this case comprising an automobile axle shaft. These work spindles 6, 7, and 8 have appropriate ring gears 10, 11 and 12 respectively as in conventional practice for center drive work spindles, and each of these ring gears 10, 11 and 12 are interconnected by suitable idler pinions 13 and 14 respectively appropriately journaled in the center drive housing 3 so that all of the work spindles 10, 11 and 12 will be rotated simultaneously in the same direction. All of these work spindles are driven by the main drive motor 15, Figure V which is appropriately mounted on a motor plate 16 mounted on a suitable pin 17 on the base 1 of the machine and which is adjustable by suitable screw 18 for effecting proper tension in the driving belt 19 which operates over the motor pulley 20 and the main drive pulley 21 fixed on the main drive shaft 22 journaled appropriately in the left hand end of the base 1 in a suitable bearing 23 and supported at its inner end in the projecting downward portion 24 of the center drive housing 3. This drive shaft 22 has an appropriate driving pinion 25 which drives an idler gear 26 journaled in center drive housing 3 which gear 26 in turn is connected in driving relationship with the center drive gear 12 on the lowest work spindle. In this way driving action from the motor 15 effects rotation of the various center drive work spindles 6, 7, and 8 at the appropriate cutting speeds necessary to machine the work pieces W.

In the left hand tailstock housing is mounted the usual tailstock barrels 27 each of which is axially reciprocable by a conventional screw and nut mechanism actuated by rotating the squared end portions 28 of the respective actuating mechanism for each of the tailstock barrels 27, and appropriate centers 29, 30, and 31 are provided in each of the tailstock barrels 27 and these centers appropriately engage center holes in the end of the work pieces W.

The right hand tailstock housing similarly has axially reciprocable tailstock barrels 32 which are actuated by hydraulic pressure, best seen in Figure IX, through the medium of a fluid pressure cylinder 33 fixed to the frame 2 by suitable screws 34 and having the usual actuating piston 35 and piston rod 36 which is connected to the lever 37 carried on a pivot pin 38 fixed to a bracket 39 on the frame 2 and having an outer end portion with a pin 40 operating in a spool 41 adjustably threaded by suitable means 42 into the tailstock barrel 32 so that reciprocation of the piston 35 in cylinder 33 effects engagement or disengagement of the center 43 carried in the tailstock barrel 32 with the work to facilitate rapid loading and unloading of the work in the machine. The centers 29 in the left hand tailstock being normally held in fixed position after proper adjustment by rotating the means 28 to thereby axially lengthwise position the work pieces properly on the work spindles with respect to the cutting tools and the center drive chucks 9.

When the piston 35 in the cylinder 33 is so actuated to have withdrawn the centers 43 to the right in the Figures I and IX and with the cutting tools appropriately retracted from the work as will be described later, the machine is then in condition for loading and unloading work pieces W into the various work spindles.

With regard to the method of loading the work W in the various work spindles it is to be noted that both of the tailstock housings 4 and 5 are one unit each respectively housing their three tailstock barrels in a single member rigidly fixed to the frame 2 of the machine. It is, therefore, necessary to provide satisfactory and adequate means to permit easy insertion of the work pieces W into the work spindle, particularly when there are a plurality of them involved as in this case. In so far as the top work spindle 6 is concerned the work W is loaded over the top of the upper tailstock barrel 27 and 43 over the surface 44 of both of these tailstock housings 4 and 5 there being adequate room in the center drive chucks 9 to permit appropriate tipping of the work piece W from the exact alignment and parallelism with the work spindle axis of each of the work spindles. However, in the lower spindles 7 and 8, access to them for axial loading of the work therein is provided by means of the loading and unloading passageways 45 and 46 respectively for the two lower work spindles. Ordinarily in the operation of this machine it is the customary practice first to load the work spindle by insertion of the work either over the surface 44 of the tailstock housing 5 and through the openings 45 and 46 of this housing to present the work to the centers 29, 30 and 31 and then to insert the centers 43 for the other tailstock barrels 32 by manipulation of the hydraulic cylinder 33 as described. After the work is completed the work in the upper spindle is then moved out over the surface 44 of the left hand tailstock housing 4 and the lower work spindles are relieved of their work pieces W by passing them axially out through the passageways 45 and 46. The machine is then ready for reinsertion of new unmachined work pieces over the surface 44 and through the passageways 45 and 46 of the right hand tailstock housing 5 and feeding the cycle as described is again resumed.

This method of handling the work into and out of the machine is best illustrated in Figure XIII wherein is shown the work at position W—1 on the right hand side of the machine as it is initially placed on the surface 44 and in the holes 45 and 46 of the right hand tailstock housing 5. The work is then moved along to the position W—2 for each of the work spindles with its left hand end inserted into the chucking devices 9 while their clamping jaws 9a have been moved to withdrawn position by the clamping bolt 9b of the chucks 9, Figure V, to permit placing of the work into the chuck and into the bore 8c of the respective center drive work spindles 6, 7, and 8. The work is then continued to be moved to the position W—3 and properly mounted on the centers 29 and 43 by moving the tailstock barrels 32 to engage the centers 43 with the ends of the work W. The chuck clamping screw 9b is operated to clamp the work W against the fixed work engaging abutment jaws 9a, Figure V, of the chucks 9, ready to begin the cutting operation.

At the completion of the cutting operation the centers 43 are removed from the work W and the work is moved from position W—3 to position W—4 with the chucks 9, of course, released from the work. From position W—4 the work is then moved to the final position W—5 where it is removed from the machine. In this last position W—5 it is positioned on the surface 44 and in the passageways 45 and 46 of the left hand tailstock housing 4. It is, of course, obvious that the work could be loaded from left to right as well as from right to left as above described depending upon the desires of the operator and the arrangement of the machine in the line-up in the manufacturing plant.

By means of this unique construction it is possible to provide a unitary rigid housing carrying the tailstock barrels for both the right and left hand sides of the machine while at the same time providing adequate passageway for easy loading of the work pieces into the various work spindles, and in particular the two lower spindles in this illustrative design, without requiring any movement to the tailstock housings. It is also to be noted that these passageways are arranged in the form of a sleeve 47 so as to maintain the operating mechanism in the tailstock housings totally enclosed at all times and free of foreign matter or other dirt or chips which may come from the work in loading it through the various passageways 45 and 46.

Referring particularly to Figure X, in this exemplary embodiment of this invention there are a series of straight turning tools 48 and 49 provided for turning the straight diameter portions 50 and 51 respectively on the work W; a series of taper turning tools 52 which are arranged to turn the tapered portion 53 of the work W; and there is also cooperating with these turning tools above, facing tools or tools feeding radially or perpendicular to the axis of rotation of the work comprising the cutting tool 54 for chamfering one end of the shaft adjacent to the portion 51 and the forming tool 55 which completes the facing and necking operations with respect to the portions 51 and 53 of the work piece W.

The cutting tools of Figure X do the turning operations on the work, that is, they have feeding substantially parallel to the axis of rotation of the work W, and are carried in the respective tool holders 56 for the tools 48, 57 for the tools 49, and the tool holder 58 for the taper turning tools 52. There of course is a series of these tools 48, 49, and 52 for each of the work spindles 6, 7, and 8 of the machine and their respective tool holders 56, 57, and 58 are mounted on appropriate tool slides which effect their feeding motion in turning the work and also have a tool relief motion perpendicular to said feeding motion whereby the tools may be retracted perpendicularly away from the work spindle axis to prevent marring of the work after the tools have once passed over the work to complete their turning operations. Tool holders 56 with their respective turning tools 48 are rigidly fixed on a plate 59 which is rigidly connected to the feeding slide 60 by suitable screws 61 and the spaces formed by the tool blocks, 56, 57, and 58 on their respective slides 59, 62 and 64 provide passageways in substantial alignment with the tailstock passageways 44, 45 and 46. Similarly the tool holders 57 are likewise mounted on a member 62 securely fixed to this same feeding slide 60 by suitable screws 63 so that horizontal movement of the slide 60 effects similar horizontal feeding movement in the tool holders 56 and 57 and their respective tools. The taper turning tools 52 are carried in their respective tool blocks 58 for each work spindle, which blocks are fixed to a sliding bar member 64 which has vertical sliding movement in a suitable dovetail guideway 65 on the feeding slide 66 and this vertical sliding movement is controlled by the taper attachment bar 67 in which operates a sliding shoe 68 carried on a suitable pin 69 fixed to the member 64 so that as this member 64 moves horizontally the cutting tool 52 will be caused to follow a tapered path in accordance with the taper set on the taper attachment bar 67.

The feeding slide 60 is carried in appropriate dovetail guideways 70 in the tool relief member 71 and carried in appropriate dovetail guideways 72 in the tool relief member 73; the tool relief members 71 and 73 being appropriately mounted in the respective dovetail guideways 74 and 75 in the frame 2 of the machine. Each of these tool relief members 71 and 73 are maintained either in a lowered position or tool relief position with the tools away from cutting position with respect to the work piece W or in a raised or cutting position for the tools by the engagement of the rollers 76, Figure II, carried on appropriate pins 77 fixed in each of the members 71 and 73 and which rollers operate on the identical tool relief cams 78 which cam is horizontally reciprocable in an appropriate guideway 79 formed in the top of the frame 2, by means of the tool relief hydraulic cylinder 80 having the usual piston rod 81 appropriately connected at 82 to the cam 78, so that by reciprocation of the cylinder 80 the tool relief slides 71 and 73 are simultaneously moved to cutting position or to retracted position.

The feeding or turning feeding motion provided for the tools 48, 49 and 52 is effected by actuation of the box shaped feeding slide 83 appropriately mounted in suitable guideways 84 formed in the top of the frame 2 of the machine, this box-shaped feeding member being reciprocated in said guideways by means of the hydraulic feed cylinder 85 bolted to the top of the frame 2 of the machine by suitable screws 86 and having a movable piston rod 87 appropriately connected at 88 to the box-shaped member 83. At the left end of this box-shaped member and to the rear of it is fixed a rack 89 which actuates the rack pinion 90 fixed on the shaft 91 appropriately journaled in the frame 2 of the machine and having on its lower end a pinion 92 which operates in a rack 93 fixed to the feed slide 60.

Similarly, at the other end of the box-shaped feeding member 83 is fixed the rack 94 which actuates the pinion 95 fixed on the shaft 96 appropriately journaled in the frame 2 of the machine and having on its lower end a pinion 97 which operates in the rack 98 fixed to the feeding slide 66. It is therefore apparent that operation of the hydraulic cylinder 85 to effect sliding movement in the box-shaped member 83 will cause appropriate rotation of the shafts 91 and 96 through the medium of their pinions 92 and 97 respectively feed the feeding slides 60 and 66 toward or away from each other to effect the necessary turning operations of their respective cutting tools 48, 49, and 52 on the work W. The pinions and racks 92—93 and 97—98 are provided sufficiently wide to permit the raising and lowering of the members 71 and 73 in tool relief movement while still maintaining proper feed engagement of the member 83 with the various tool feeding slides 60 and 66 so that the tools may be retracted from their fed-in positions when the members 71 and 73 have relieved the tools from cutting action with the work and may then bring the tools back to a cutting position when the feeding slides have removed the tools from the starting position for again continuing the cutting cycle of the machine.

Obviously, movement of the slide 66 horizontally in the guideways 72a in the member 73 will cause the tool block supporting member 64 to have slight vertical movement in addition to its horizontal feeding movement as effected by the slide 66, to in this way effect the taper turning motion in the tools 52 for machining the tapered end portion 53 of the work W.

Cooperating with these turning tools just described are the facing tools 54 and 55. These tools are carried on appropriate tool holders 99 and 100, as best seen in Figure V. These tool holders 99 and 100 are carried on appropriate feed rock shafts 101 journaled in the tailstock housing 4 and 5 so as to swing their respective cutting tools radially to and from the work to effect facing or forming operations on the work piece. These rock shafts 101 are actuated in feeding and rapid return movement from the same box-shaped feeding member 83 by means of the cams 102, Figures VI and VIII, which are fixed on this member 83 and which cams actuate rollers 103 carried on appropriate studs 104 fixed to the vertical actuating rods 105, which rods have appropriate slots 106 in which operate the pins 107 on the lever arms 108 fixed to the rock feeding shafts 101 so that reciprocation of the member 83 causes rocking motion of the levers 108 and corresponding rocking motion in the tool holders 99 and 100 for swinging the facing tools 54, 55 to or from the work piece W.

Having thus fully set forth and described this invention what is claimed as new and desired to be secured by United States Letters Patent is:

1. In a lathe, a frame having work spindles in which a work piece may be mounted and rotated on a work axis, a tool relief slide mounted for translation on said frame toward and from said axis, a second relief slide mounted on said frame for translation parallel to said first frame, there being aligned ways on said slides parallel to said axis, a feeding slide mounted by and for translation along both of said ways, a second feeding slide mounted by and for translation along the ways of one feeding slide only, tool holders carried by said feeding slides, first power means connected to translate said relief slides, and second power means connected to translate said tool feeding slides for all positions of translation of said relief slides.

2. In a lathe, a frame, spindles on said frame and adapted to journal a work piece therebetween for rotation on an axis, a tool relief slide mounted for translation on said frame toward and from said axis, a feeding slide mounted on said relief slide for movement along said axis, said feeding slide being adapted to mount cutting tools for movement in cutting relation with a work piece in said spindles, a first rack on said feeding slide, a shaft journaled in said frame and having first and second pinions thereon, an operating slide translatable on said frame normal to the axis of said shaft, a second rack on said operating slide, said first and second pinions meshing with said first and second racks, respectively.

3. In a lathe, a frame, spindles journaled on said frame to receive a work piece for rotation on an axis, a tool relief slide mounted on said frame for sliding toward and from said axis, a feeding slide mounted on said relief slide for translation along and adjacent said axis and adapted to fixedly carry cutting tools for cutting a work piece rotating on said spindles, a track on said frame, a cam slidable along said track, and means attached to said relief slide and controlled by said cam to positively move said relief slide in relief movement.

4. In a lathe, a frame, a plurality of pairs of work spindles on said frame each pair being positioned to receive a work piece therebetween for rotation on horizontal, superposed work axes, a tool relief slide vertically translatable on ways on said frame, a feeding slide translatable on said relief slide along said axes, a tool holder plate fixed on said feeding slide and adapted to hold tools in simultaneous cutting engagement with said respective work pieces, cam means operable to translate said relief slide, and means operable to translate said feeding slide on said relief slide for all position of translation of said relief slide.

5. In a taper-cutting lathe, a frame having means to receive and rotate a work piece on an axis, a first slide guided on said frame for translation toward and from said axis, a second slide on said first slide and guided thereby for movement parallel to said axis, a third slide on said second slide and guided thereby for translation toward and from said axis, tool holder means on said third slide, cam track means on one of said first and third slides and a shoe on the other of said first and third slides engaging said track means, means for translating said second slide to thereby cause taper feeding movement of said third slide, and means for translating all of said slides as a unit from said axis in tool relief movement.

6. In a taper cutting lathe, a frame having means to receive and rotate a work piece on an axis, a tool relief slide guided on said frame for movement toward and from said axis, a feeding member guided on said relief slide for movement parallel to said axis, a tool slide guided on said feeding member for movement toward and from said axis and adapted to hold a tool for cutting a work piece, taper cam and shoe means interposed between said slides whereby said tool slide is given a taper-cutting movement as said feeding member is moved on said relief slide, means for so moving said feeding member, and means for moving said relief slide whereby said feeding member, and tool slide are moved as a unit toward and from said axis.

7. In a lathe, a frame having means to receive and rotate a work piece about an axis, a pair of relief slides, guide means mounting said slides on said frame for translation toward and from said axis, power operated means for so translating said slides equally and in unison, a feeding slide guided on and by said relief slides for translation in a path parallel to said axis, a tool holder carried by said feeding slide, a second feeding slide guided on and by one of said relief slides for translation in said path, a power-operated slide, and connections between said power-operated slide and said feeding slides for moving said feeding slides simultaneously along said path.

8. In a lathe, a frame having means to receive and rotate a work piece on an axis fixed relatively thereto, a tool relief means slidable on said frame toward and from said axis and having guide means defining a path parallel to said axis, a pair of feeding slides guided for translation along said path by said guide means, tool holders carried by said feeding slides, each feeding slide having a rack parallel to said path, parallel shafts journaled on said frame, each having a pinion meshing with a respective rack, a power slide guided on said frame in a path normal to said shafts, racks on said power slide, and second pinions on said shafts each in mesh with a respective rack on said power slide.

9. In a lathe, a frame having means to receive and rotate a work piece on an axis, tool relief means guided on said frame for translation toward and from said axis, said tool relief means having guide means determining a path extending along said axis, a pair of feeding slides guided by said guide means for movement along said path, holders fixed to said feeding slides and adapted to grip tools for cutting a work piece, power means operable to simultaneously move said feeding slides along said path, in opposite directions, and cam and rider means operable to translate said tool relief means relatively to said frame whereby said feeding slides and holders are moved as a unit in tool relief movement.

WILLIAM F. GROENE.
ARTHUR W. AUFDERHAR.